Nov. 2, 1965        E. LATTA        3,215,875

DYNAMOELECTRIC MACHINE

Filed Sept. 27, 1962

INVENTOR.
EDWARD LATTA
BY Bayard H. Michael
ATTORNEY

United States Patent Office 3,215,875
Patented Nov. 2, 1965

---

3,215,875
DYNAMOELECTRIC MACHINE
Edward Latta, Owosso, Mich., assignor to Controls Company of America, Melrose Park, Ill., a corporation of Delaware
Filed Sept. 27, 1962, Ser. No. 226,659
10 Claims. (Cl. 310—154)

This invention relates to permanent magnet motors and, more particularly, to an arrangement for holding the rotating element of a permanent magnet motor stationary when the motor is de-energized.

In many electric motor applications it is desirable that the rotating element of the motor, the motor armature, remain stationary when the motor is de-energized. To this end, various brake designs have been proposed which become operative when the motor is de-energized. Although these brakes are effective, they increase both the size and cost of the motor.

The primary object of this invention is to provide an effective arrangement for holding the rotating element of a permanent magnet motor stationary when the motor is de-energized without increasing the size, cost or complexity of the motor.

For the achievement of this and other objects, it is proposed to provide a motor having a core structure and permanent magnet members magnetized and arranged relative to each other so as to provide circumferentially spaced areas of alternating magnetic polarity adjacent the core structure. The core structure is provided with means which is effective when the motor is at rest to distribute the transference of magnetic flux between the magnet members and the core structure in such a manner as to provide a retarding force which will oppose relative rotational movement between the magnet members and the core structure. The means on the core structure and the areas of alternating polarity are arranged with respect to each other such that they will align, when the motor is at rest, in a manner to most effectively produce the retarding force.

Other objects and advantages will be pointed out in, or be apparent from, the specification and claims, as will obvious modification of the embodiments shown in the drawings, in which:

Figure 6:
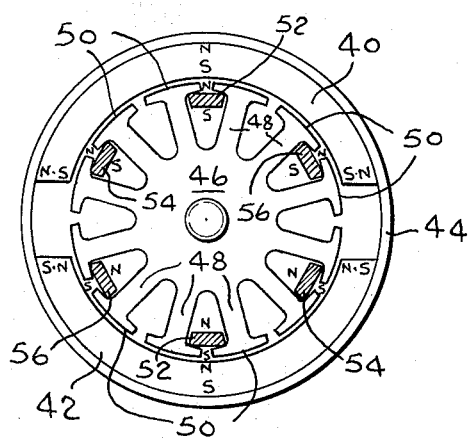
Figure 5:
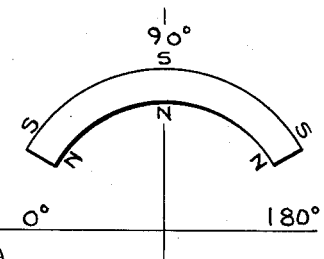

FIG. 5 further illustrates the magnetic distribution in one of the permanent magnets; and FIG. 6 illustrates another alternate construction.

Since the construction of a permanent magnet motor is well known, only that portion of the motor which is necessary for an understanding of this invention has been illustrated and will be described. More particularly and with reference to the drawings, an electric motor includes permanent magnets 10 and 12 which are generally arcuate in configuration and are supported in diametrically opposed relationship on motor shell 14. Magnets 10 and 12 are arranged on the motor shell with their adjacent ends spaced apart to provide gaps 16 and 18 therebetween. As will be discussed more fully hereinafter, magnets 10 and 12 are oppositely magnetized in a radial direction to provide circumferentially spaced areas of alternating magnetic polarity. For example, the inner face of magnet 10 is a south magnetic pole and its outer face is a north pole, whereas, the inner face of magnet 12 is a north pole and its outer face a south pole.

Figure 1:
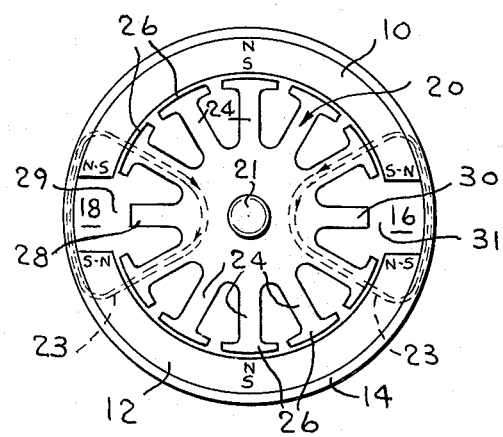
FIG. 1 is an end view of a preferred embodiment illustrating the armature core in its rest position.

An armature core structure 20 is supported on a shaft 21 for rotation within the magnets. As is well known in the art, armature core 20 is made up of a plurality of metallic laminations 22. The configuration of each lamination is such that the assembled armature core includes a plurality of relatively spaced radially extending teeth 24 each of which terminates in a generally arcuate face 26, faces 26 being disposed adjacent the inner surface of the magnetic members 10 and 12. A magnetic circuit is then completed which includes the magnets, motor shell 14 and armature core 20, see FIG. 1 wherein magnetic lines of flux are represented by dotted lines 23.

Figure 2:
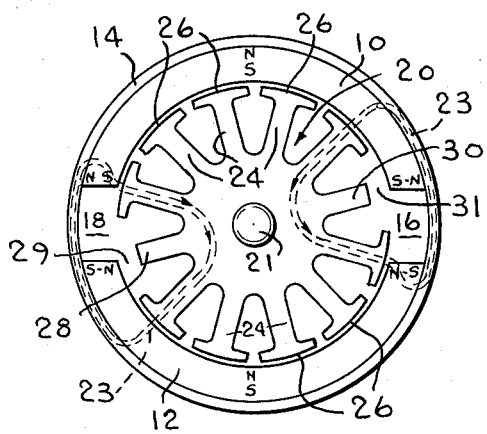
FIG. 2 is an end view thereof illustrating the armature core as displaced slightly from its rest position.

In accordance with this invention, the armature core is provided with two radially extending members 28 and 30 which terminate in spaced relation from the circumference defined by arcuate faces 26 so as to provide gaps 29 and 31 in the armature core. The radial members 28 and 30 are relatively spaced in accordance with the relative positioning of magnets 10 and 12. More particularly members 28 and 30 are so positioned that when the motor is de-energized gaps 29 and 31 in the armature core will be aligned with areas 16 and 18 between the magnets, in this instance the magnets being positioned in diametrically opposed relationship, the radial members 28 and 30 are also positioned in diametrically opposed relationship. When the motor is de-energized the gaps in the armature core are aligned with the areas between the magnets and the radial teeth 24 on either side of each of the members 28 and 30, or gaps 29 and 31, are aligned with the ends of magnet members 10 and 12 to provide an even distribution of the magnetic flux transferred between the magnets and the armature core (see FIG. 1). The even distribution of magnetic flux between the armature core and the magnets provides a retarding force which will oppose any tendency of the armature core to rotate relative to the magnets. More particularly, as the armature core is displaced counterclockwise to the position illustrated in FIG. 2, the trailing magnetic lines of flux resist this motion and tend to pull the armature core clockwise thereby opposing movement of the armature core from its rest position of FIG. 1 and tending to return the armature to that position. Such an arrangement concentrates and evenly distributes the magnetic lines of flux between the armature core and magnets and provides a braking action while utilizing only those elements which are normally included in the motor thereby maintaining a relatively simplified construction.

Figure 3:
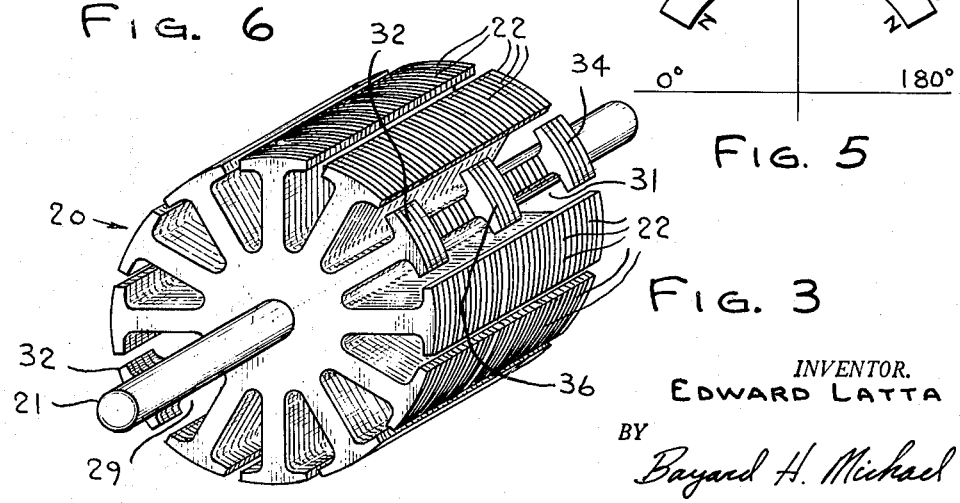
FIG. 3 illustrates an alternate construction.

An armature core having gaps 29 and 31 can be fabricated by assembling laminations having uniformly extending radial members and removing the extremities of one, two or more of the radial members as desired or as determined by the number of magnets used and the spaces therebetween. To facilitate winding the armature core, it may be desirable in some instances to include arcuate faces 32 and 34 at the opposed ends of the gaps 29 and 31 (see FIG. 3). Furthermore, for use in connection with some automatic armature winding equipment, it may also be desirable to include an arcuate face 36 in the central portion of each gap.

Figure 4:
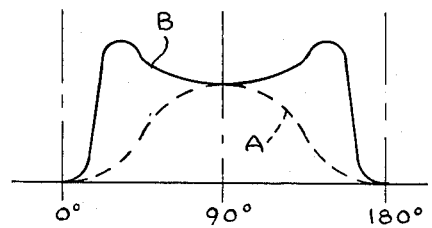
FIG. 4 is a graphic representation of the magnetic distribution in the permanent magnet.

FIG. 4 illustrates the magnetic distribution in the permanent magnets. Preferably, ceramic magnets are used as they provide wider versatility with respect to the magnetic distribution available. With reference to the embodiments of FIGS. 1–3, the direction of magnetization is radial so that the opposed faces of each magnet assume opposite polarities. More particularly, the inner face of magnet 10 is a south magnetic pole and the outer face thereof is a north magnetic pole, whereas, the inner face of magnetic members 12 is a north magnetic pole and its outer face is a south magnetic pole. Normally the magnetic distribution in magnets 10 and 12 follows the dotted line A of FIG. 4 wherein the magnetic charge increases from a relatively low value adjacent one end thereof to a maximum in the midportion of the magnet and decrease to a low value at the opposite end of the magnet. Such a magnetic distribution will give satisfactory results, however, to further enhance the braking action, the magnets can be magnetized as illustrated by the full line B in FIG. 4 whereby he magnetic charge is relatively high at its opposed ends as well as in its midportion, in fact the charge is a maximum adjacent its opposed ends. Such a magnetic distribution places areas of high magnetic charge adjacent the teeth positioned on either side of gaps 29 and 31 when the motor is de-energized. It will be appreciated that a variety of magnetic charge distributions are possible and that this invention is not necessarily limited to the use of those shown.

Another alternative construction is illustrated in FIG. 6 and comprises magnets 40 and 42, again preferably ceramic magnets, supported from a motor shell 44 and having an armature core 46 mounted for rotation within the magnets. In this embodiment the radially extending teeth 48 of the armature core terminate uniformly in arcuate faces 50. Permanent magnet members, which can also be ceramic magnets, are arranged between the teeth in diametrically opposed pairs 52—52, 54—54, and 56—56. Magnet 40 is magnetized radially so that its inner face is a south magnetic pole and its outer face is a north magnetic pole and magnet 42 is magnetized such that its inner face is a north magnetic pole and its outer face is a south magnetic pole. The magnets of each of the pairs of magnets are oppositely magnetized to cooperate with the opposite magnetization of magnets 40 and 42. For example one magnet 52, which will align with magnet 40, is magnetized radially so that its outer face is a north magnetic pole and its inner face is a south pole, whereas, the other magnet 52, which will align with magnet 42, is magnetized so that its outer face is a south magnetic pole and its inner face is a north pole. It will be appreciated that one pair of permanent magnets can be supported in the armature structure or two, three or more pairs as desired can be provided and that the magnets 40 and 42 can be magnetized so as to provide areas having a high magnetic charge which will align with the pairs of permanent magnets; for example, with the three pairs of permanent magnets illustrated in FIG. 6 a magnetic distribution in permanent magnets 40 and 42 in accordance with line B of FIG. 4 is preferred as it will provide a very effective braking action. When the motor is de-energized the permanent magnets supported in the armature core will align with areas on the magnets 40 and 42 of opposite magnetic polarity to provide an attractive force between magnets 40 and 42 and the armature core which opposes rotation of the armature core.

It will be noted that an arrangement is provided which will exert a braking action on the motor armature tending to hold the armature at rest when the motor is de-energized. The arrangement maintain the relative simplicity of the permanent magnet motor structure and does not materially add to either the cost or size thereof.

Although this invention has been illustrated and described in connection with particular embodiments thereof, it will be apparent to those skilled in the art that various changes and modifications may be made therein without departing from the spirit of the invention or from the scope of the appended claims.

What I claim is:

1. In a permanent magnet motor the combination of, permanent magnet means providing circumferentially spaced areas of magnetization, a core structure, said magnet means and said core structure supported for relative rotational movement therebetween, said core structure including means spaced circumferentially on said core structure with the spacing therebetween being equal to the spacing between said spaced areas of magnetization and operative when said motor is de-energized to position said core and magnet means in a predetermined relationship effective to evenly distribute the transference of magnetic flux between said spaced areas of magnetization and said core and achieve a retarding force in opposition to relative rotational movement between said magnet means and said core structure when said motor is de-energized.

2. In a permanent magnet motor the combination of, permanent magnet means defining a first generally arcuate face and providing circumferentially spaced areas of magnetization, a core structure arranged to define a second generally arcuate face adjacent to and co-axial with said first arcuate face, said core structure and said magnet means supported for relative rotational movement, said core structure including means defining open areas in said second arcuate face extending radially from said second arcuate face away from said first arcuate face, said open areas being relatively spaced on said core structure with the spacing therebetween being equal to the spacing between said areas of magnetization and arranged to be positioned intermediate said areas of magnetization when said motor is de-energized to achieve an even distribution of the transference of flux between said areas of magnetization and the areas of said second arcuate face adjacent said open areas to provide a retarding force for opposing relative rotational movement between said magnet means and said core structure when said motor is at rest.

3. In a permanent magnet motor the combination of, a plurality of magnetic members each having generally arcuate faces arranged in co-axial relationship, said magnetic members arranged with their adjacent ends in relative spaced relation, a core structure arranged for rotation relative to said magnetic members, said core structure including a plurality of members projecting toward and terminating uniformly adjacent said arcuate faces to define a first periphery generally co-axial with said arcuate faces, said core structure also including portions intermediate a pair of said members and terminating in radial spaced relation from and defining an open area in said periphery, said portions relatively spaced in accordance with the spacing between adjacent ends of said magnetic members and arranged to be positioned, when said motor is de-energized, in alignment with the spacing between said magnetic members to affect an even distribution of the transference of magnetic flux between said magnetic means and the members of said core structure adjacent said open areas to provide a retarding force for opposing rotation of said core structure.

4. In a permanent magnet motor the combination of, first and second magnetic members each having generally arcuate faces arranged in co-axial relationship, said magnetic members arranged in relative spaced relation to provide open areas therebetween, an armature core arranged for rotation relative to said magnetic members, said armature core including a plurality of first radially extending members terminating uniformly adjacent said arcuate faces to define a circumference generally co-axial with said acruate faces, said core structure also including second radially extending members intermediate a pair of said members and terminating in radial spaced relation from said circumference, said second members having the same spacing therebetween as the spacing between said open areas between said magnetic members so that, when said motor is de-energized, said second members are aligned with said open areas to provide an even distrubtion of magnetic flux between said magnetic members and the members of said core structure immediately adjacent said second members for opposing rotational movement of said armature core.

5. The motor of claim 4 wherein said magnetic members are positioned in diametrically opposed relationship and provide diametrically opposed open areas and wherein said second member of said armature core are positioned in diametrically opposed relationship.

6. In a permanent magnet motor the combination of permanent magnet means defining a first generally arcuate face and providing circumferentially spaced areas of optimum magnetization along said arcuate face, a core structure, said core structure and said magnetic means supported for relative rotational movement, second magnetic means mounted on and rotatable with said armature core, said second magnetic means arranged on said core in accordance with the spacing between said areas of optimum magnetization and being magnetized so that when said motor is de-energized said second magnetic means align with said areas of optimum magnetization to provide an attractive force therebetween for opposing relative rotational movement between said permanent magnet means and said core structure.

7. In a permanent magnet motor the combination of a plurality of first ceramic magnetic members each having generally arcuate faces and arranged with said arcuate faces in co-axial relationship, said first magnetic members magnetized to provide circumferentially spaced areas of optimum magnetization along said arcuate face, a core structure arranged for relative rotational movement with said first magnetic members, said core structure including a plurality of radially extending members terminating adjacent said arcuate faces, and a plurality of relatively spaced second magnetic members supported between said radially extending members, the relative spacing between said second magnetic members corresponding to the relative spacing between said areas of optimum magnetization and said second members being magnetized so that when said motor is de-energized said second magnetic members are aligned with said areas of optimum magnetization to provide an attractive force between said magnetic members and said core structure for opposing said relative rotational movement.

8. The motor of claim 7 wherein said areas of optimum magnetization are arranged in diametrically opposed pairs and said second magnetic members are arranged in diametrically opposed pairs.

9. In a permanent magnet motor the combination of, permanent magnet means providing circumferentially spaced areas of optimum magnetization, a core structure, said magnet means and said core structure supported for relative rotational movement therebetween, said core structure including means relatively spaced apart a distance equal to the spacing between said areas of magnetization and operative, when said motor is de-energized, to position said core and magnet means in a predetermined relationship effective to evenly distribute the transference of magnetic flux between said areas of optimum magnetization and said core and achieve a retarding force in opposition to relative rotational movement between said magnet means and said core structure when said motor is de-energized.

10. In a permanent magnet motor the combination of, first and second ceramic magnetic members each having generally arcuate faces arranged in co-axial relationship, said magnetic members arranged in relative spaced relation to provide open areas therebetween and being magnetized to provide areas of optimum magnetization spaced circumferentially on said arcuate faces and disposed adjacent said open areas, an armature core arranged for rotation relative to said magnetic members, said armature core including a plurality of first radially extending members terminating uniformly adjacent said arcuate faces to define a circumference generally co-axial with said arcuate faces, said core structure also including second radially extending members intermediate pairs of said first members and terminating in radial spaced relation from said circumference, said second members having the same spacing therebetween as the spacing between said open areas between said magnetic members so that, when said motor is de-energized, said second members are aligned with said open areas to provide an even distribution of magnetic flux between said areas of optimum magnetization and the members of said core structure immediately adjacent said second members to achieve a retarding force in opposition to rotational movement of said armature core.

References Cited by the Examiner

UNITED STATES PATENTS

| 2,864,018 | 12/58 | Aeschmann | 310—154 X |
| 3,042,818 | 7/62 | Busch | 310—152 X |
| 3,121,815 | 2/64 | Sidell | 310—156 X |

MILTON O. HIRSHFIELD, *Primary Examiner.*